(12) United States Patent
Dasgupta et al.

(10) Patent No.: US 10,354,549 B2
(45) Date of Patent: Jul. 16, 2019

(54) METHODS AND SYSTEMS FOR TRAINING A CROWDWORKER

(71) Applicant: Conduent Business Services, LLC, Dallas, TX (US)

(72) Inventors: Koustuv Dasgupta, Bangalore (IN); Laura E Celis, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 14 days.

(21) Appl. No.: 15/299,561

(22) Filed: Oct. 21, 2016

(65) Prior Publication Data
US 2017/0039879 A1   Feb. 9, 2017

Related U.S. Application Data

(63) Continuation of application No. 13/890,280, filed on May 9, 2013, now abandoned.

(51) Int. Cl.
*G09B 19/00* (2006.01)
*G06Q 10/06* (2012.01)
(Continued)

(52) U.S. Cl.
CPC .......... *G09B 19/00* (2013.01); *G06Q 10/0639* (2013.01); *G06Q 10/06311* (2013.01);
(Continued)

(58) Field of Classification Search
CPC ....... G06Q 10/06398; G06Q 10/06311; G06Q 10/0639; G06Q 10/063112;
(Continued)

(56) References Cited

U.S. PATENT DOCUMENTS

| 7,110,525 B1 * | 9/2006 | Heller | ................... | H04M 3/523 |
| | | | | 379/265.11 |
| 8,867,838 B2 | 10/2014 | Balamurugan et al. | | |

(Continued)

OTHER PUBLICATIONS

"The Information Capacity of the Human Motor System in Controlling the Amplitude of Movement" Paul M. Fitts, Ohio State University; Journal of Experimental Psychology: General, 1992, vol. 121, No. 3, 262-269; pp. 262-269.

(Continued)

*Primary Examiner* — Jack Yip
(74) *Attorney, Agent, or Firm* — Jones Robb, PLLC

(57) ABSTRACT

Disclosed embodiments illustrate methods and systems implementable on a computing device for training a crowdworker on one or more skill sets. The crowdworker attempts a first set of tasks. The method includes determining an expertise gap between a current level of expertise possessed by the crowdworker in the one or more skill sets and a required level of expertise in the one or more skill sets. Further, the method includes determining a number of training tasks that the crowdworker has to complete to achieve the required level of expertise in the one or more skill sets. At least one training task pertaining to the one or more skill sets is assigned along with the first set of tasks such that the crowdworker gets trained on the one or more skill sets in a predetermined period without violating a service level agreement associated with the first set of tasks.

17 Claims, 5 Drawing Sheets

(51) Int. Cl.
*G09B 7/00* (2006.01)
*G09B 5/00* (2006.01)
*G09B 7/02* (2006.01)
*G06Q 50/20* (2012.01)
*G06N 5/02* (2006.01)
*G09B 7/04* (2006.01)

(52) U.S. Cl.
CPC ....... *G06Q 10/06398* (2013.01); *G06N 5/022* (2013.01); *G06Q 10/0637* (2013.01); *G06Q 10/063112* (2013.01); *G06Q 50/205* (2013.01); *G09B 5/00* (2013.01); *G09B 7/00* (2013.01); *G09B 7/02* (2013.01); *G09B 7/04* (2013.01); *H04M 2203/403* (2013.01)

(58) Field of Classification Search
CPC .... G06Q 10/0637; G06Q 50/205; G09B 7/02; G09B 7/04; G09B 7/00; G09B 5/00; G09B 19/00; H04M 2203/403; G06N 5/022
USPC ....... 434/362, 219, 350, 322, 107, 118, 365; 705/7.42, 328, 7.38, 326
See application file for complete search history.

(56) References Cited

U.S. PATENT DOCUMENTS

| | | | |
|---|---|---|---|
| 2004/0063085 A1* | 4/2004 | Ivanir | G09B 5/14 434/322 |
| 2007/0206768 A1* | 9/2007 | Bourne | G06Q 10/06311 379/265.01 |
| 2009/0286217 A1 | 11/2009 | Kobayashi | |
| 2010/0159433 A1* | 6/2010 | Graham | G09B 7/08 434/353 |
| 2010/0233663 A1 | 9/2010 | Pennington et al. | |
| 2012/0090446 A1* | 4/2012 | Moreno | G09B 15/00 84/470 R |
| 2013/0006717 A1* | 1/2013 | Oleson | G06Q 10/06311 705/7.41 |
| 2013/0185138 A1 | 7/2013 | Roy et al. | |
| 2014/0279780 A1 | 9/2014 | Dasgupta et al. | |
| 2016/0260336 A1* | 9/2016 | Chapman | G09B 5/00 |

OTHER PUBLICATIONS

"Generalized Additive Models for Location Scale and Shape", Mikis Stasinopoulos and Bob Rigby, STORM, London Metropolitan University, GAMLSS: Short course Cordoba, Argentina, Oct. 2012.

"Financial Incentives and the 'Performance of Crowds'", Winter Mason and Duncan J. Walls, Yahoo! Research.

"Constrained Shortest Paths and Related Problems", Mark Ziegelmann, Jul. 30, 2001.

* cited by examiner

| LIST OF CROWDWORKERS | ONE OR MORE SKILLS | LEVELS OF EXPERTISE — 310 | | |
|---|---|---|---|---|
| | | BASIC — 308 | ADVANCED | EXPERT |
| CROWDWORKER-1 | SKILLS-1 — 316 | ✓ — 318 | ✗ | ✗ |
| | SKILLS-2 — 320 | ✗ | ✓ — 322 | ✗ |
| | SKILLS-3 | ✓ | ✗ | ✓ |
| CROWDWORKER-2 | SKILLS-1 | ✓ | ✗ | ✗ |
| | SKILLS-2 | ✗ | ✗ | ✗ |
| | SKILLS-3 | ✗ | ✗ | ✓ |

FIG. 3

METHODS AND SYSTEMS FOR TRAINING A CROWDWORKER

This patent application is a continuation of U.S. patent application Ser. No. 13/890,280 filed on May 9, 2013, entitled METHODS AND SYSTEMS FOR TRAINING A CROWDWORKER.

TECHNICAL FIELD

The presently disclosed embodiments are related, in general, to crowdsourcing. More particularly, the presently disclosed embodiments are related to systems and methods for training a crowdworker.

BACKGROUND

Crowdsourcing platform allows distribution of one or more tasks to one or more crowdworkers. The one or more crowdworkers may be loosely defined as groups of individual crowdworkers that may work on the one or more tasks. The crowdsourcing platform may receive the one or more tasks from a requestor. The requestor may declare a service level agreement with the crowdsourcing platform indicating the timelines and the remuneration details associated with the one or more tasks.

The crowdsourcing platform may distribute the one or more tasks as per the skill set of the one or more crowdworkers. For example, the one or more tasks include a first set of tasks that require a crowdworker possessing a first skill set. The crowdsourcing platform identifies a set of crowdworkers from the one or more crowdworkers that possess the first skill set. Thereafter, the crowdsourcing platform presents the first set of tasks to the identified set of crowdworkers. One or more of the identified set of crowdworkers may opt to attempt the presented tasks.

In a scenario, when the bandwidth of the identified set of crowdworkers is full, and the crowdsourcing platform receives more tasks that require the set of crowdworkers possessing the first skill set, the crowdsourcing platform may not be able to distribute the tasks (requiring first skill set) to the identified set of crowdworkers. Therefore, the crowdsourcing platforms may violate the SLA with requestor and thereby the business may get hampered.

Thus, there is a need to train other crowdworkers on a desired sills (e.g., the first skill set) such that the crowdsourcing platform is able to counter such scenarios.

SUMMARY

According to embodiments illustrated herein there is provided a method implementable on a computing device for training a crowdworker on one or more skill sets. The crowdworker attempts a first set of tasks. The method includes determining an expertise gap between a current level of expertise possessed by the crowdworker in the one or more skill sets and a required level of expertise in the one or more skill sets. Further, the method includes determining a number of training tasks that the crowdworker has to complete to achieve the required level of expertise in the one or more skill sets. At least one training task pertaining to the one or more skill sets is assigned along with the first set of tasks such that the crowdworker gets trained on the one or more skill sets in a predetermined period without violating a service level agreement associated with the first set of tasks. The processor in the computing device performs the method.

According to embodiment illustrated herein a crowdsourcing platform server for training a crowdworker on one or more skill sets. The crowdworker attempts a first set of tasks. The crowdsourcing platform server includes a processor. Further, the crowdsourcing platform server comprises a memory that further comprises an expertise determination module configured to determine an expertise gap between a current level of expertise possessed by the crowdworker in the one or more skill sets and a required level of expertise in the one or more skill sets. Further, the expertise determination module is configured to determine a number of training tasks that the crowdworker has to complete to achieve the required level of expertise in the one or more skill sets. The memory further comprises a task manager configured to assign at least one training task pertaining to the one or more skill sets along with the first set of tasks such that the crowdworker gets trained on the one or more skill sets in a predetermined period without violating a service level agreement associated with the first set of tasks.

According to embodiments illustrated herein there is provided a computer program product for use with a computer. The computer program product comprising a non-transitory computer readable medium embodied therein a set of instructions executable by a processor for training a crowdworker on one or more skill sets. The crowdworker attempts a first set of tasks. The set of instructions includes a program instruction means for determining an expertise gap between a current level of expertise possessed by the crowdworker in the one or more skill sets and a required level of expertise in the one or more skill sets. Further, the set of instructions includes a program instruction means for determining a number of training tasks that the crowdworker has to complete to achieve the required level of expertise in the one or more skill sets. Additionally, the set of instructions includes a program instruction means for assigning at least one training task pertaining to the one or more skill sets along with the first set of tasks such that the crowdworker gets trained on the one or more skill sets in a predetermined period without violating a service level agreement associated with the first set of tasks.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which:

FIG. 3 depicts a table illustrating an example representation of the skill set matrix data, in accordance with at least one embodiment;

DETAILED DESCRIPTION

Figure 1:
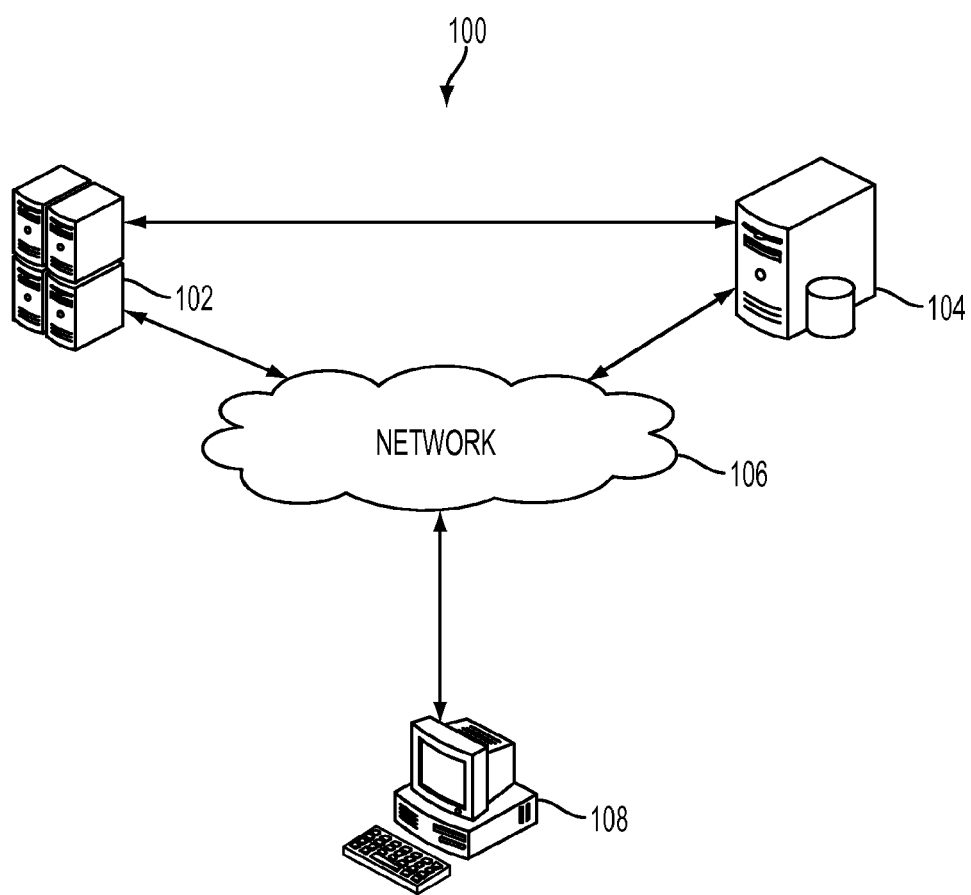
FIG. 1 is a block diagram of a system environment in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "task" refers to a piece of work, an activity, an action, a job, an instruction or an assignment to be performed. Tasks may necessitate the involvement of one or more crowdworkers. Examples of tasks include, but are not limited to, digitization of a document, generating a report, evaluating a document, conducting a survey, writing a code, extracting data, translating text, and the like.

"Crowdsourcing" refers to distributing tasks by soliciting the participation of loosely defined groups of individual crowdworkers. A group of crowdworkers may include, for example, individuals responding to a solicitation posted on a certain website such as, but is not limited to, Amazon Mechanical Turk and Crowd Flower.

A "crowdsourcing platform" refers to a business application, wherein a broad, loosely defined external group of people, communities, or organizations provides solutions as outputs for any specific business processes received by the application as input. In an embodiment, the business application may be hosted online on a web portal (e.g., the crowdsourcing platform servers). Various examples of the crowdsourcing platforms include, but are not limited to, Amazon Mechanical Turk or Crowd Flower.

A "crowdworker" refers to a workforce/worker(s) that may perform one or more tasks, which generate data that contributes to a defined result such as proofreading a part of a digital version of an ancient text or analyzing a quantum of a large volume of data. According to the present disclosure, the crowdworker(s) includes, but is not limited to, a satellite center employee, a rural business process outsourcing (BPO) firm employee, a home-based employee, or an internet-based employee. Hereinafter, "crowdworker", "worker", "remote worker" "crowdsourced workforce", "crowdworker", and "crowd" may be interchangeably used.

A "skill set" refers to a set of skills possessed by a crowdworker. In an embodiment, the crowdworker may utilize the set of skills to complete the task. Some examples of the skill set may include, but are not limited to, digitizing electronic document, image labeling, translation, etc.

A "service level agreement (SLA)" refers to an agreement between a crowdsourcing platform and a crowdworker. In an embodiment, the SLA may define a time interval in which the crowdworker is bound to complete a task, a required accuracy, and remuneration associated with completion of the task.

A "level of expertise" refers to a measure of expertise of a crowdworker in a particular skill set. In an embodiment, the level of expertise may include, but not limited to, an expert level, an advanced level, and a basic level. In an embodiment, if a first crowdworker possesses the expert level in the particular skill set, the crowdworker will be able to complete all the tasks pertaining to the particular skill set in stipulated period accurately (e.g., adhere to SLAs). Similarly, if a second crowdworker possesses the advanced level in the particular skill set, the crowdworker will be able to complete most of the tasks pertaining to the particular skill set with acceptable accuracy. Further, the second crowdworker may violate SLA associated with some of the tasks pertaining to the particular skill set. If a third crowdworker possesses the basic level of expertise in the skill set, the crowdworker will be able to complete very few tasks pertaining to the particular skill set in comparison to the first crowdworker and the second crowdworker.

FIG. 1 is a block diagram of a system environment 100 in which various embodiments can be implemented. The system environment 100 includes a crowdsourcing platform server 102, a database server 104, a network 106, and a computing device 108.

The crowdsourcing platform server 102 is configured to host one or more crowdsourcing platforms. One or more crowdworkers are registered with a crowdsourcing platform. Further, the crowdsourcing platform offers one or more tasks to the one or more crowdworkers. In an embodiment, the crowdsourcing platform offers the one or more tasks based on the one or more skill sets possessed by each of the one or more crowdworkers. Further, the crowdsourcing platform trains the one or more crowdworkers by offering one or more training tasks along with the one or more tasks. In an embodiment, the crowdsourcing platform presents a user interface (UI) to the one or more crowdworkers through a web based interface or a client application. The one or more crowdworkers may access the one or more tasks through the web based interface or the client application. Further, the one or more crowdworkers may submit a final work product/response to the crowdsourcing platform through the UI. The crowdsourcing platform may validate the response for quality checks. In an embodiment, the crowdsourcing platform server 102 may be realized through an application server such as but not limited to, Java application server, .NET framework, and Base4 application server. The crowdsourcing platform server 102 is described later in conjunction with FIG. 2.

The database server 104 stores information associated with the one or more crowdworkers. In an embodiment, the information associated with the one or more crowdworkers may include, but not limited to, a skill set matrix associated with each of the one or more crowdworkers, a validation data associated with previously completed tasks. Further, the database server 104 stores metadata associated with the one or more tasks. The metadata associated with the one or more tasks is described later in conjunction with FIG. 4. The database server 104 may be realized through various technologies, such as, but not limited to, Microsoft® SQL server, Oracle, and My SQL. In an embodiment, the crowdsourcing platform server 102 and/or the computing device 108 may connect to the database server 104 using one or more protocols such as, but not limited to, ODBC protocol and JDBC protocol.

A person having ordinary skills in the art would understand that the scope of the disclosure is not limited to the database server 104 as a separate entity. In an embodiment, the functionalities of the database server 104 can be integrated into the crowdsourcing platform server 102.

The network 106 corresponds to a medium through which content and messages flow between various devices of the system environment 100 (e.g., the crowdsourcing platform server 102, the database server 104, and the computing device 108). Examples of the network 106 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 106 in accordance with the various wired and wireless communication protocols such as Transmission Control Protocol and Internet Protocol (TCP/IP), User Datagram Protocol (UDP), and 2G, 3G, or 4G communication protocols.

The computing device 108 presents the UI (received from the crowdsourcing platform) to a crowdworker. In an embodiment, the UI is a web interface facilitated by the crowdsourcing platform. The crowdworker receives a task from the crowdsourcing platform through the UI. Further, the crowdworker submits the final work product/response through the UI on the computing device 108. Some of the examples of the computing device 108 include a personal computer, a laptop, a PDA, a mobile device, a tablet, or any device that has the capability to display the user interface to the crowdworker.

Figure 2:
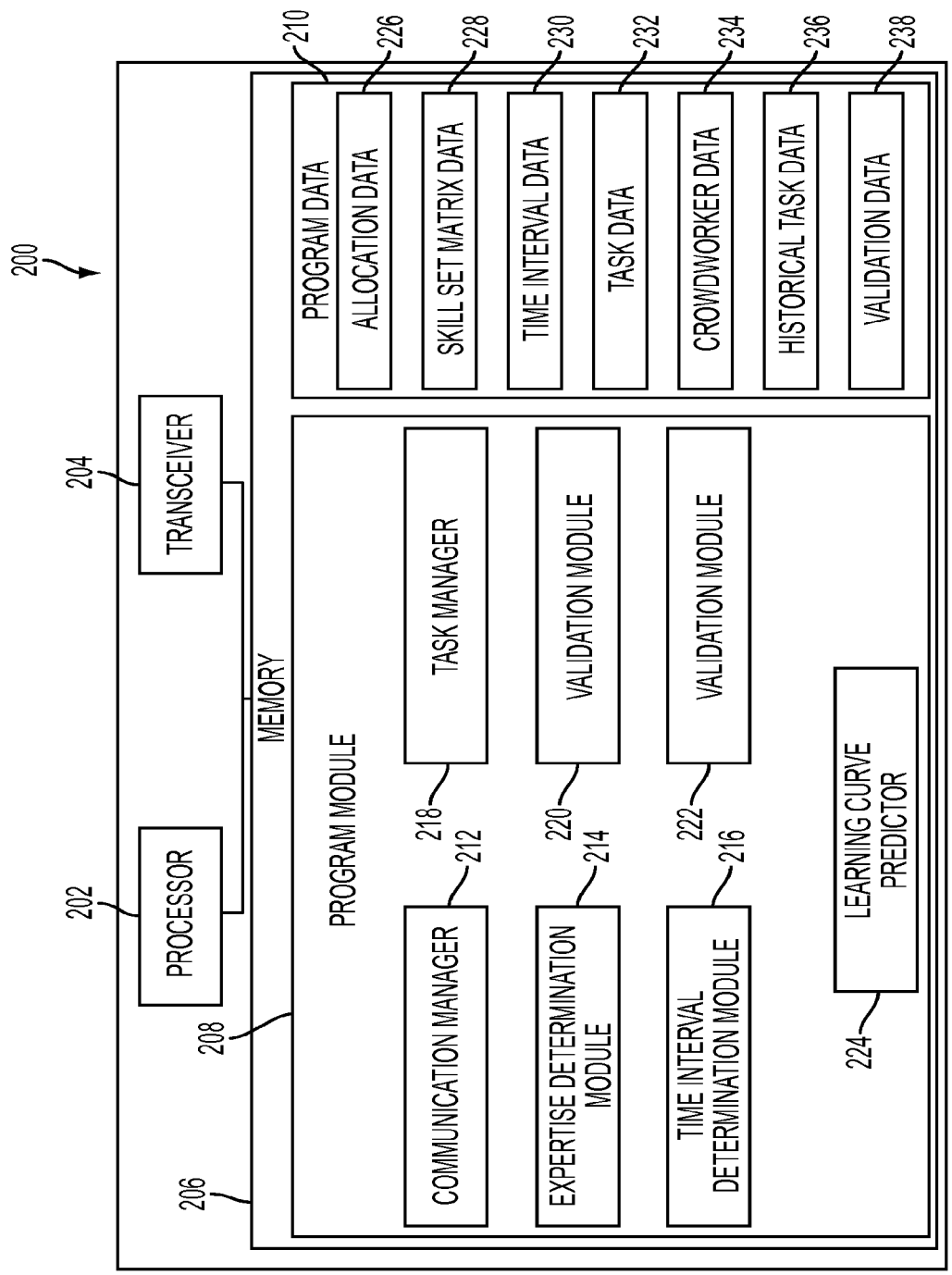
FIG. 2 is a block diagram of a crowdsourcing platform server, in accordance with at least one embodiment.

FIG. 2 is a block diagram of the crowdsourcing platform server 102, in accordance with at least one embodiment. The crowdsourcing platform server 102 includes a processor 202, a transceiver 204, and a memory 206. The crowdsourcing platform server 102 is described in conjunction with FIG. 1.

The processor 202 is coupled to the transceiver 204 and the memory 206. The processor 202 executes a set of instructions stored in the memory 206 to perform a predetermined operation on the crowdsourcing platform server 102. The processor 202 can be realized through a number of processor technologies known in the art. Examples of the processor 202 may include, but are not limited to, microprocessor such as X86 processor, RISC processor, ASIC processor, CISC processor, ARM processor, or any other processor.

The transceiver 204 transmits and receives messages and data to/from various components of the system environment 100 (e.g., the computing device 108 and the database server 104) through the network 106. Examples of the transceiver 204 may include, but are not limited to, an antenna, an Ethernet port, a USB port or any other port that can be configured to receive and transmit data. The transceiver 204 transmits and receives data/messages in accordance with the various communication protocols, such as, TCP/IP, UDP, and 2G, 3G, or 4G communication protocols.

The memory 206 stores a set of instructions and data. Some of the commonly known memory implementations include, but are not limited to, a random access memory (RAM), a read only memory (ROM), a hard disk drive (HDD), and a secure digital (SD) card. Further, the memory 206 includes a program module 208 and a program data 210. The program module 208 includes a set of instructions that is executable by the processor 202 to perform specific operations. The program module 208 further includes a communication manager 212, an expertise determination module 214, a time interval determination module 216, a task manager 218, a validation module 220, an SLA manager 222, and a learning curve predictor 224. It is apparent to a person having ordinary skills in the art that the set of instructions stored in the memory 206 enables the hardware of the crowdsourcing platform server 102 to perform the predetermined operation.

The program data 210 includes an allocation data 226, a skill set matrix data 228, a time interval data 230, a task data 232, a crowdworker data 234, a historical task data 236, and a validation data 238.

The communication manager 212 receives one or more tasks from a requestor through the transceiver 204. The communication manager 212 stores the one or more tasks as the task data 232. In an embodiment, the communication manager 212 further stores metadata associated with the one or more tasks as the task data 232. Further, the communication manager 212 transmits the UI to the computing device 108 through the transceiver 204. The communication manager 212 receives responses for the one or more tasks from the one or more crowdworkers through the UI. The communication manager 212 includes various protocol stacks such as, but not limited to, TCP/IP, UDP, and 2G, 3G, or 4G communication protocols. The communication manager 212 transmits and receives the messages/data (e.g., images) through the transceiver 204 in accordance with such protocol stacks.

The expertise determination module 214 extracts information associated with one or more crowdworkers from the crowdworker data 234. In an embodiment, the information associated with the one or more crowdworkers include, but are not limited to, credentials associated with each of the one or more crowdworkers, a set of tasks previously completed by each of the one or more crowdworkers, and an accuracy score on each task in the set of tasks, a first time interval consumed by the crowdworker to complete the set of tasks. The expertise determination module 214 utilizes the information associated with the one or more crowdworkers to determine one or more skill sets of the one or more crowdworkers. Additionally, the expertise determination module 214 determines a current level of expertise of the one or more crowdworkers in each of the one or more skill sets based on the accuracy score and the first time interval. Further, the expertise determination module 214 determines a required level of expertise that the one or more crowdworker needs to achieve from the metadata associated with the one or more tasks. Based on the required level of expertise and the current level of expertise, the expertise determination module 214 determines an expertise gap. The expertise determination module 214 stores the current level of expertise, the required level of expertise, and the expertise gap as the skill set matrix data 228. The skill set matrix data 228 is described later in conjunction with FIG. 3. The determination of expertise gap is described later in conjunction with FIG. 4. In an embodiment, the expertise determination module 214 utilizes one or more data mining techniques such as, but is not limited to, anomaly detection, clustering, classification, regression, and summarization.

The time interval determination module 216 determines the expertise gap for each of the one or more crowdworkers in each of the one or more skill sets from the skill set matrix data 228. Based on the expertise gap, the time interval determination module 216 determines a second time interval. In an embodiment, the second time interval is indicative of a time that a crowdworker from the one or more crowdworkers will take to complete a task of a particular skill set. The time interval determination module 216 stores the second time interval as the time interval data 230.

The task manager 218 extracts the metadata of the one or more tasks from the task data 232. In an embodiment, the metadata associated with the one or more tasks includes, but are not limited to, a third time interval in which each of the one or more tasks has to be completed, and a skill set required for completing each of the one or more tasks. Based on the metadata, the task manager 218 determines a skill set required for each of the one or more tasks. The task manager 218 determines respective skill sets of each of the one or more crowdworkers from the skill set matrix data 228. Further, the task manager 218 determines the second time interval associated with each of the one or more crowdworkers for completing a task pertaining to the respective skill sets. Thereafter, the task manager 218 offers the one or more tasks to the one or more crowdworkers based on the second time interval, the respective skill sets, and the metadata associated with the one or more tasks. In an embodiment, the task manager 218 offers at least one training task to the one or more crowdworkers pertaining to at least one of the respective skill sets or a skill set other than the respective skill sets. The task assignment is described later in conjunction with FIG. 4.

The validation module 220 validates the responses for the one or more tasks and the training task. The validation module 220 checks whether the responses for the one or more tasks and the training task are correct. Further, the validation module 220 generates a validation result based on the check. In an embodiment, the validation module 220 utilizes at least one of a consensus technique to validate the responses for the training task and the one or more tasks. The validation module 220 stores the validation result as the validation data 238. In an embodiment, the validation module 220 may be realized through a comparator that compares the responses for the one or more tasks with the one or more correct responses to generate the validation data 238. Based the validation data 238, the expertise determination module 214 determines an expertise gain of each of the one or more crowdworkers in at least one of the respective skill sets or the skill set other than the respective skill sets.

The SLA manager 222 extracts the validation result from the validation data 238. Further, the SLA manager 222 determines an actual time consumed by the one or more crowdworkers to submit the response for each of the one or more tasks. Based on the validation result and the time consumed, the SLA manager 222 determines a number of instances for each of the one or more crowdworkers where the each of the one or more crowdworkers has violated the SLA.

The learning curve predictor 224 predicts a learning curve for each of the one or more crowdworkers. The learning curve predictor 224 determines the expertise gain of each of the one or more crowdworkers. Based on the expertise gain, the learning curve predictor 224 predicts the learning curve of each of the one or more crowdworkers in at least one of the respective skill sets or the skill set other than the respective skill sets.

FIG. 3 depicts a table 300 illustrating an example representation of the skill set matrix data 228, in accordance with at least one embodiment. The table 300 is described in conjunction with FIG. 1 and FIG. 2.

The table 300 includes a column 302 illustrating a list of names of crowdworkers. For instance, the column 302 includes the name or ID of "crowdworker-1" (depicted by 314) and the name or ID of "crowdworker-2" (depicted by 324). Further, the table 300 includes a column 304 illustrating a list of one or more skills associated with each of the one or more crowdworkers (listed in the column 302). For instance, the "crowdworker-1" (depicted by 314) possesses the "skill-1" (depicted by 316). Columns 308, 310, and 312 together depict levels of expertise (depicted by 306). The column 308 illustrates whether a crowdworker possesses a basic level of expertise in the one or more skill sets. For example, the "crowdworker-1" (depicted by 314) possesses a basic level of expertise (depicted by 318) in the "skill-1" (depicted by 316). Similarly, the "crowdworker-1" (depicted by 314) possesses an advanced level of expertise (depicted by 322) in the "skill-2" (depicted by 320).

Figure 4:
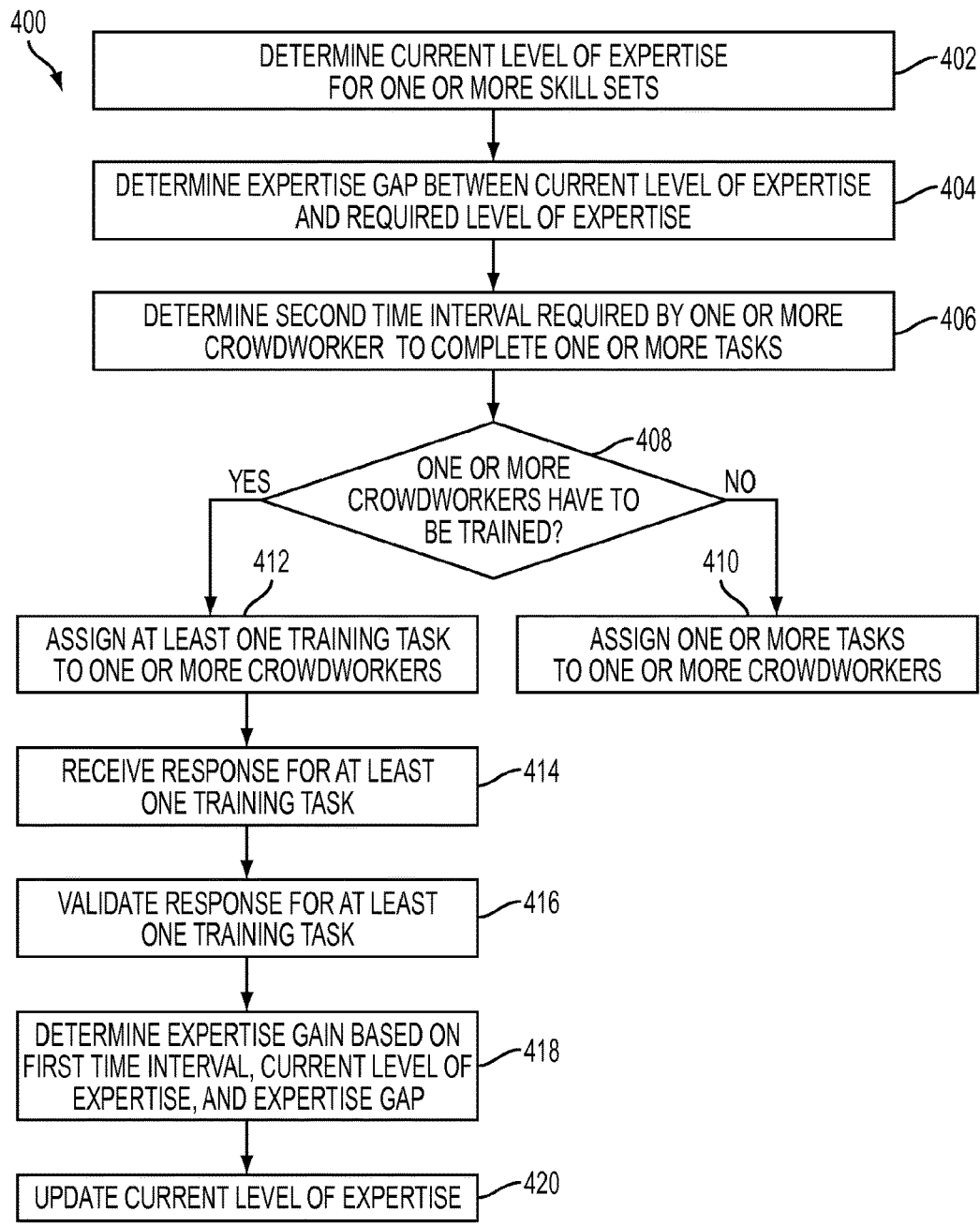
FIG. 4 is a flowchart illustrating a method for assigning one or more tasks to one or more crowdworkers, in accordance with at least one embodiment; and FIG. 5A

FIG. 4 is a flowchart 400 illustrating a method for training one or more crowdworkers, in accordance with at least one embodiment. The flowchart 400 is described in conjunction with FIG. 1, FIG. 2, and FIG. 3.

At step 402, a current level of expertise of the one or more crowdworkers is determined for each of the one or more skill sets. In an embodiment, the expertise determination module 214 determines the current level of expertise of the one or more crowdworkers. Prior to determining the current level of expertise, the communication manager 212 receives the one or more tasks from a requestor. The communication manager 212 stores the one or more tasks as the task data 232. Further, the communication manager 212 stores the metadata associated with the one or more tasks as the task data 232. Following table illustrates an example representation of the metadata:

TABLE 1

Illustrates metadata associated with the one or more tasks

| One or more tasks | Required skill set | Expertise level required | Third time interval |
|---|---|---|---|
| Task-1 | Skill-1 | Basic | 5 days |
| Task-2 | Skill-2 | Expert | 0.5 day |
| Task-3 | Skill-1 | Advanced | 1 day |

For example, the "task-1" requires a crowdworker having the "basic level" of expertise in the "skill-1" to complete the task. Further, 5 days may be required for completing the "task-1". Similarly, for the "task-2", a crowdworker having "expert" level of expertise in "skill-2" is required to complete the task. Further, 0.5 days may be required for completing the "task-2".

Thereafter, the expertise determination module 214 determines the current level expertise of the one or more crowdworkers in the one or more skills set from the skill set matrix data 228. For example, the expertise determination module 214 determines that a crowdworker possesses the "basic level" expertise in the "skill-1". In an embodiment, the current level of expertise of the one or more crowdworkers is predetermined.

At step 404, the expertise gap between the current level of expertise and the required level of expertise is determined. In an embodiment, the expertise determination module 214 determines the expertise gap. Prior to determining the expertise gap, the expertise determination module 214 determines the required level of expertise from the metadata associated with the one or more tasks (refer Table 1). Further, the expertise determination module 214 determines the current level of expertise for each of the one or more crowdworkers from the information associated with the each of the one or more crowdworkers (stored as the crowdworker data 234). Thereafter, the expertise determination module 214 digitizes each of the current level of expertise and the required level of expertise using a step function. In an embodiment, following table illustrates mapping between the various expertise levels and the corresponding discrete levels:

TABLE 2

Illustrates mapping between the expertise level and the corresponding discrete value range.

| Expertise level | Discrete value range |
|---|---|
| Basic level | 0-0.33 |
| Advanced level | 0.33-0.66 |
| Expert level | 0.66-0.99 |

For example, for the "basic" level of expertise, the discrete value range is "0-0.33". Similarly, for the "advanced" level of expertise and the "expert" level of expertise, the discrete value range is "0.33-0.66" and "0.66-0.99," respectively.

Post digitization, of the current level and the required level of expertise, the expertise determination module 214 determines the expertise gap. In an embodiment, the expertise determination module 214 utilizes the following equation to determine the expertise gap:

$$\gamma(b_p, b_r) = \frac{Dist(b'_p, b_r)}{Dist(b_0, b_*)} \quad (1)$$

where,
$b_p$: Current expertise level;
$b_r$: Required expertise level;
$b_p'$: if $b_p(i) > b_r(i)$, then $b_p'(i) = b_r(i)$ else $b_p'(i) = b_p(i)$;
i: domain;
Dist: Euclidean distance between the expertise levels;
$b_0$: No expertise
$b_*$: Perfect expertise At step 406, the second time interval required by each of the one or more crowdworkers to complete each of the one or more tasks is determined. In an embodiment, the time interval determination module 216 determines the second time interval. Prior to determining the second time interval, the time interval determination module 216 determines a rate of learning for each of the one or more crowdworkers in each of the one or more skill sets based on the expertise gap. In an embodiment, the time interval determination module 216 utilizes the following equation to determine the rate of learning:

$$\alpha(b_p, b_r) = \beta\left(1 - \frac{\log\left(1 + \frac{\gamma(b_p, b_r)}{t(b_r)}\right)}{\log(v(b_r))}\right) \quad (2)$$

where,
$\alpha(b_p, b_r)$: Rate of learning a particular skill set for a crowdworker;
$\beta$: Universal rate of learning;

$t(b_r)$: Time spent by a crowdworker on a task pertaining to a particular skill set; and
$v(b_r)$: Total number of tasks pertaining to the particular skill set completed by the crowdworker.

After determining the rate of learning, the time interval determination module 216 determines the second time interval based on the rate of learning determined by using equation 2. In an embodiment, the time interval determination module 216 utilizes the following equation to determine the second time interval:

$$T_n'(b_p, b_r) = T_1(b_r) n^{-\alpha(b_p, b_r)} \quad (3)$$

where,
$T_n'(b_p, b_r)$: Expected time to complete $n^{th}$ task requiring $b_r$ expertise; and
$T_1(b_r)$: Ideal time required to complete a task requiring $b_r$ expertise.

At step 408, a check is performed whether the one or more crowdworkers have to be trained. In an embodiment, the task manager 218 performs the check. Prior to performing the check, the task manager 218 determines the skill set required by each of the one or more tasks from the metadata associated with the one or more tasks (stored as the task data 232). Further, the task manager 218 categorizes each of the one or more tasks in the one or more expertise bins based on the required skill set. For example, the "task-1" is categorized in "skill-1" bin (refer table 1) as the "task-1" requires crowdworker possessing "skill-1". In an embodiment, each of one or more expertise bins includes a set of tasks. Thereafter, the task manager 218 determines the skill sets possessed by each of the one or more crowdworkers. In an embodiment, the task manager 218 determines whether enough number of crowdworkers possessing the required skill set is present to take up the set of tasks pertaining to the required skill set. In an embodiment, the task manager 218 further determines whether the enough number of crowdworkers have the required level of expertise in the required skill set to take up the set of tasks. If the task manager 218 determines that the enough number of crowdworkers is not present, the task manager 218 decides to train the one or more crowdworkers.

In an alternate embodiment, the task manager 218 extracts historical data from the historical task data 236. Based on the historical task data 236, the task manager 218 predicts the flow of reception of the one or more tasks during the course of a day. Further, the task manager 218 determines the availability of the one or more crowdworkers during the course of the day. Following table illustrates an example representation of the historical task data 236:

TABLE 3

Illustrates sample historical data

| Time of the day | Skill set | Expertise level | Number of tasks received | Number of crowdworkers available |
|---|---|---|---|---|
| 9AM-12PM | Skill-1 | Basic | 10 | 10 |
| | | Advanced | 5 | 5 |
| | | Expert | 0 | 0 |
| | Skill-2 | Basic | 9 | 9 |
| | | Advanced | 2 | 2 |
| | | Expert | 2 | 2 |
| 12PM-3PM | Skill-1 | Basic | 2 | 2 |
| | | Advanced | 9 | 3 |
| | | Expert | 9 | 3 |
| | Skill-2 | Basic | 9 | 3 |
| | | Advanced | 10 | 5 |
| | | Expert | 2 | 2 |

TABLE 3-continued

Illustrates sample historical data

| Time of the day | Skill set | Expertise level | Number of tasks received | Number of crowdworkers available |
|---|---|---|---|---|
| 3PM-6PM | Skill-1 | Basic | 5 | 5 |
|  |  | Advanced | 5 | 5 |
|  |  | Expert | 5 | 5 |
|  | Skill-2 | Basic | 6 | 6 |
|  |  | Advanced | 6 | 6 |
|  |  | Expert | 6 | 6 |

For example, between time interval "9 AM-12 PM" usually enough crowdworkers are available for each of the one or more skills set and the expertise level. For instance, usually "10" tasks pertaining to the "skill-1" and requiring "basic" level of expertise are received between the time interval "9 AM-12 PM". Most of the time, 10 crowdworkers having the "basic" level of expertise in the "skill-1" are available. Similarly, between time interval "12 PM-3 PM" not enough number of crowdworkers are available that possess the "skill-2" in the "advanced" level of expertise. Thus, the task manager 218 determines that there is a need to train the crowdworkers that possess the "skill-2" in the "basic" level of expertise such that in predetermined period they achieve the "advanced" level of expertise in the "skill-2".

A person having ordinary skills in the art would understand that the scope of the disclosure is not limited to organizing the historical data as illustrated in Table 3. In an embodiment, various other techniques such as, but are not limited to, a hierarchal model, a network model, and a relational model can be used for organizing the historical data.

The task manager 218 determines such time intervals where there is a shortage of crowdworkers possessing a particular skill set. In an embodiment, the task manager 218 starts training the crowdworkers for such time intervals. In an embodiment, the crowdworkers may be trained to achieve higher level of expertise in the skills sets that the crowdworkers possess. For example, the crowdworker having "basic" level of expertise in the "skill-1" may be trained to achieve "advanced" level of expertise in the "skill-1". In another embodiment, the crowdworkers may be trained on skills sets other than the skills set possessed by the crowdworkers. For example, the crowdworker having the "advanced" level of expertise in the "skill-1" may be trained to achieve the "basic" level of expertise in the "skill-2".

If at step 408, it is determined that the one or more crowdworkers are not to be trained, step 410 is performed. At step 410, the one or more tasks are assigned to the one or more crowdworkers based on the expertise gap and the second time interval. In an embodiment, the task manager 218 assigns the one or more tasks. The task manager 218 assigns the one or more tasks as per the skill set possessed by the one or more crowdworkers. In an embodiment, the expertise gap of the one or more crowdworkers in the respective skill set tends to zero (i.e., $\gamma \rightarrow 0$). Further, the second time interval for the crowdworker to complete a task in the respective skill set approaches the ideal time interval (i.e., $T_n' \rightarrow T_1$). As the one or more tasks are assigned as per the skill set possessed by the one or more crowdworkers, the number of instances where the SLA is violated is minimized. In an embodiment, each of the one or more crowdworkers has a first set of tasks pertaining to the skill sets possessed by the one or more crowdworkers.

For example, a first crowdworker have an expertise gap of 0.5 in the first skill set and 0.1 expertise gap in second skill set. The task manager 218 has a first task pertaining to the first skill set and a second task pertaining to the second skill set. The task manager 218 would assign the second task to the first crowdworker as the expertise gap of the first crowdworker for the second skill set tends to zero. As the first crowdworker will be able to complete the second task proficiently and accurately within the stipulated time, the chances of SLA violations reduce.

If at step 408, it is determined that the one or more crowdworkers have to be trained, step 412 is performed. At step 412, the at least one training task is assigned to the one or more crowdworkers. In an embodiment, the task manager 218 assigns the at least one training task. Additionally, the task manager 218 assigns the one or more tasks to the one or more crowdworkers in addition to the training task as described in the step 410. In an embodiment, the training task may pertain to other skill sets that are not possessed by the one or more crowdworkers. In another embodiment, the training task may correspond to a task that requires a higher level expertise in a skill set than what is possessed by the one or more crowdworkers in the same skill set. In an embodiment, the training task is selected from the one or more tasks received by the crowdsourcing platform server 102.

For example, a first crowdworker possesses the "basic" level of expertise in the "skill-1". The crowdsourcing platform server 102 receives the one or more tasks from the requestor such that the first set of tasks from the one or more tasks requires the "basic" level of expertise in the "skill-1". The remaining tasks from the one or more tasks require "advanced" level of expertise in the "skill-1". For instance, not enough number of crowdworkers possessing "advanced" level of expertise in the "skill-1" is available to take up the remaining tasks. In such a scenario, the task manager 218 decides to train the first crowdworker so that the first crowdworker attains "advanced" level of expertise in the "skill-1". The task manager 218 assigns the first set of tasks to the first crowdworker. In addition to the first set of tasks, the task manager 218 assigns a task from the remaining tasks as the training task to the first crowdworker.

In an embodiment, the number and frequency of the training tasks to be assigned to the one or more crowdworkers vary based on the time required by the crowdworker to complete the training task and the SLA associated with the one or more tasks. For example, a crowdworker does not have any experience in a first skill set and is an expert in a second skill set. Further, the crowdworker has an SLA to complete 15 tasks pertaining to the second skill set in an hour. If the crowdworker consumes a lot of time in completing the training task pertaining to the first skill set, the task manager 218 may reduce the frequency of assigning the training task so that the SLA associated with the one or more tasks is not compromised. For instance, initially if five training task were being assigned to the crowdworker, the task manager 218 would reduce it to two training task per hour. In another embodiment, the task manager 218 may assign the training task of lower difficulty so that the time taken by the crowdworker to attempt this training task is reduced so that the SLA is not compromised.

In an embodiment, the number of training task assigned to the one or more crowdworkers is determined based on the expertise gap of the one or more crowdworkers in the one or more skill sets, and the predetermined period in which the one or more crowdworkers is expected achieve the required level of expertise. For example, the first crowdworker need to work on 10 training tasks to achieve the "advanced" level of expertise. Further, the predetermined period is one week. Thus, the task manager 218 assigns at least two training tasks each day along with the first set of tasks so that the first crowdworker achieves the "advanced" level of expertise in a week's time.

At step 414, a response for the at least one training task is received from the one or more crowdworkers. In an embodiment, the communication manager 212 receives the response for the at least one training task.

At step 416, the response of the at least one training task is validated. In an embodiment, the validation module 220 validates the response of the at least one training task by comparing the response with the correct response. In an embodiment, the validation module 220 stores the result of the validation as the validation data 238.

In alternate embodiment, the validation module 220 collects one or more responses for the at least one training task from the one or more crowdworkers. Thereafter, the validation module 220 determines a majority of common responses from the one or more response. The majority of common responses are treated as correct answers.

At step 418, an expertise gain for each of the one or more crowdworkers is determined based on the validation. In an embodiment, the expertise determination module 214 determines the expertise gain. The expertise determination module 214 extracts the validation result from the validation data 238. If the validation result is correct, the expertise determination module 214 updates the expertise gain. In an embodiment, the expertise determination module 214 utilizes following equation to determine the expertise gain:

$$b_p = b_p + \alpha(b_p, b_r) \log(1 + \gamma(b_p, b_r)) * b_p \quad (4)$$

In an embodiment, bigger the expertise gap, higher an opportunity to learn for the one or more crowdworker and hence greater is the gain on completing the training task. However, as the number of training tasks completed by the one or more crowdworkers increases, the expertise gap decreases as well as the expertise gain.

Additionally, the expertise determination module 214 determines the number of tasks that the one or more crowdworkers have to complete to achieve the required level of expertise in the particular skill set based on the expertise gain and the expertise gap. In an embodiment, the training task is assigned to the one or more crowdworkers based on the number of training tasks.

In an embodiment, the learning curve predictor 224 predicts a learning curve for each of the one or more crowdworkers based on the expertise gain and the rate of learning. An example of a learning curve is described later in conjunction with FIG. 5A, and FIG. 5B.

At step 420, the current level of expertise of the one or more crowdworkers is updated. In an embodiment, the expertise determination module 214 updates the current level of expertise based on the expertise gain. In an embodiment, the expertise determination module 214 updates the current level of expertise post completion of the number of training tasks determined in the step 418.

As the training task is assigned to the one or more crowdworkers along with the first set of tasks, the one or more crowdworker get trained while completing the first set of tasks. Further, as the one or more crowdworker are proficient in the respective skills set, the SLA violations associated with the first set of tasks is minimized.

Figure 5A:
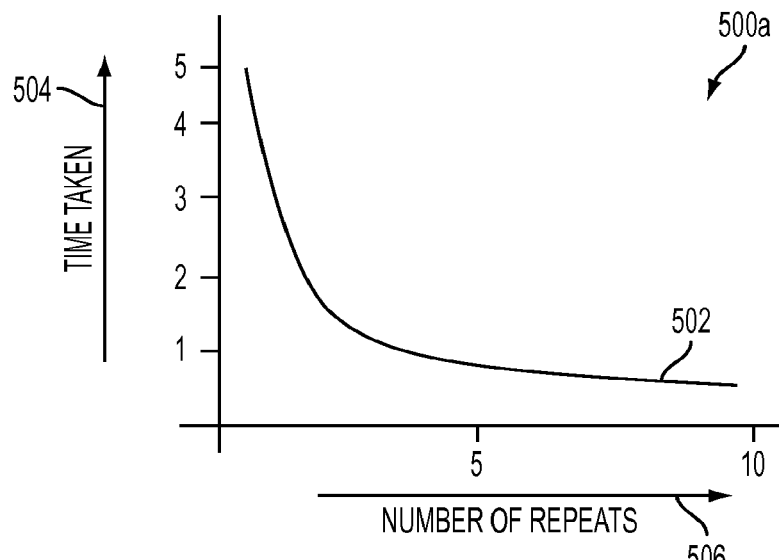
FIG. 5B is a graphical representation illustrating a learning curve of a crowdworker, in accordance with at least one embodiment.

FIG. 5A is a graphical representation 500a of a learning curve of a crowdworker, in accordance with at least one embodiment.

The graphical representation 500a includes a graph 502. The X-axis for the graph 502 represents "number of training tasks" (depicted by 506). The Y-axis of the graph 502 represents the "time taken to complete a training task" (depicted by 504). As it can be observed from the graph 502 that the time taken by the crowdworker to compete the training task reduces with the number of training tasks completed by the crowdworker.

Figure 5B:
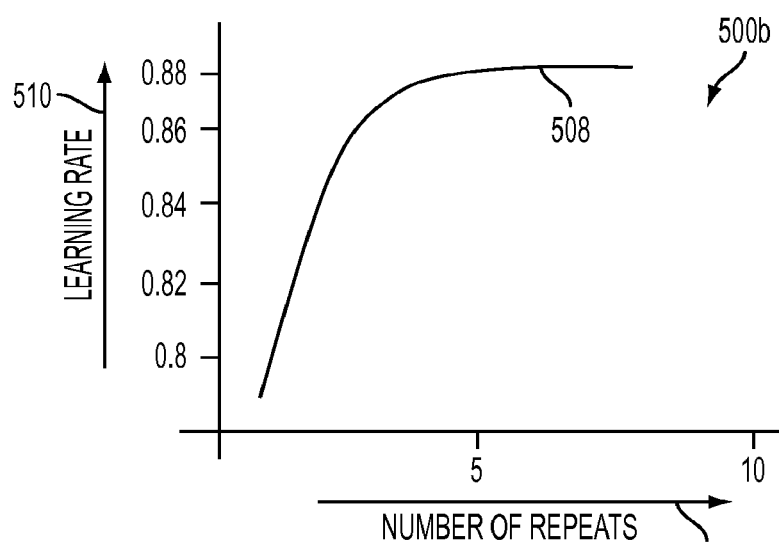

FIG. 5B is a graphical representation 500b of a learning curve of a crowdworker, in accordance with at least one embodiment.

The graphical representation 500b includes a graph 508. The X-axis for the graph 508 represents "number of training tasks" (depicted by 506). The Y-axis of the graph 504 represents "learning rate" (depicted by 510). As from the graph 508, it can be observed that the learning rate reaches saturation with the number of training tasks completed by the crowdworker.

The disclosed embodiments encompass numerous advantages. The one or more crowdworkers are presented with one or more tasks as per the respective skills set. Along with the one or more tasks, the one or more crowdworkers are assigned with a training task. The training task may correspond to task that require other skill or an upgrade in the present skill that the crowdworker has. As the one or more crowdworker are proficient in the respective skills set, the SLA violations associated with the first set of tasks is minimized. Other than the first set of tasks, the one or more crowdworkers work on the training task. Thus, the one or more crowdworkers get trained on the other skill set along with completing the first set of tasks pertaining to respective skill sets. Therefore, the one or more crowdworker are trained on the other skill set or able to upgrade their skills without violating the SLA of the first set of tasks assigned as per the respective skill sets.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in all operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for training a crowdworker have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for achieving efficient task processing using automation techniques based on predicted conditions, the method comprising:
    predicting, by a processor, a flow of received tasks and an availability of crowdworkers of a first level of expertise and second level of expertise over a predetermined period of time, the predicting being based on historical data, wherein the flow of received tasks includes a first set of tasks corresponding to the first level of expertise and a second set of tasks corresponding to a second level of expertise;
    determining, by the processor, based on the predicted flow of received tasks and the predicted availability of crowdworkers, to train a first number of crowdworkers such that the predicted availability of crowdworkers of the second level of expertise and the trained first number of crowdworkers satisfies a demand based on the predicted flow of the second set of tasks over the predetermined period of time;
    determining, by the processor, an expertise gap between a current level of expertise possessed by a first crowdworker and the second level of expertise, wherein the current level of expertise meets or exceeds the first level of expertise and wherein determining the expertise gap comprises:
        converting the current level of expertise of the first crowdworker, the second level of expertise, and the first level of expertise to discrete values based on an expertise mapping table, and
        calculating a ratio of a Euclidean distance between the discrete value of the current level of expertise and the discrete value of the discrete value of the second level of expertise and a Euclidean distance between a discrete value of a lowest theoretical expertise and a discrete value of a highest theoretical expertise, wherein the ratio represents the expertise gap;
    calculating, by the processor, a learning rate for the first crowdworker, wherein the learning rate is calculated based on a universal rate of learning that is modified by the expertise gap;
    identifying, by the processor, training tasks for the first crowdworker to achieve the second level of expertise based on the determined expertise gap;
    determining, by the processor, a predicted set of tasks that comprise non-training tasks predicted to be received prior to the predetermined period of time;
    accessing, by the processor, service requirements for the first set of tasks; and
    training, by the processor, the crowdworkers such that upon completion of the training of the crowdworkers, the predicted availability of crowdworkers of the second level of expertise will satisfy the demand based on the predicted flow of the second set of tasks, wherein training the crowdworkers comprises:

assigning, based on the learning rate, a set of training tasks to the first crowdworker such that the first crowdworker comprises availability for the non-training tasks of the predicted set of tasks and such that processing requirements for the predicted set of tasks are met by the first crowdworker and other crowdworkers that are available to process the predicted set of tasks and that comprise a skill level required to process the predicted set of tasks.

2. The method of claim 1, further comprising determining, by the processor, a first time interval corresponding to the first crowdworker for completing the identified training tasks based on the expertise gap.

3. The method of claim 2, further comprising validating, by the processor, a response to at least one of the identified training tasks from the first crowdworker.

4. The method of claim 3, wherein the learning rate of the first crowdworker is based on the first time interval, the validation, and the expertise gap, and wherein the learning rate is indicative of a level of expertise gained by the first crowdworker by completing the at least one identified training tasks.

5. The method of claim 4, further comprising determining, by the processor, a number of training tasks for the first crowdworker to achieve the second level of expertise based on the first time interval the expertise gap.

6. The method of claim 4, further comprising determining, by the processor, an expertise gain based on the expertise gap, the learning rate, the validation, and the first time interval, wherein the expertise gain is indicative of a gain in expertise by the first crowdworker by completing the training tasks.

7. The method of claim 4, further comprising updating, by the processor, the level of expertise of the first crowdworker based on the validation, the learning rate, and the first time interval.

8. The method of claim 1, wherein the predetermined period of time comprises a time of day on a given day of a week.

9. A crowdsourcing platform server for achieving efficient task processing using automation techniques based on predicted conditions, the crowdsourcing platform server comprising:
a processor and memory configured to:
predict a flow of received tasks and an availability of crowdworkers of a first level of expertise and second level of expertise over a predetermined period of time, the predicting being based on historical data, wherein the flow of received tasks includes a first set of tasks corresponding to the first level of expertise and a second set of tasks corresponding to a second level of expertise;
determine based on the predicted flow of received tasks and the predicted availability of crowdworkers, to train a first number crowdworkers such that the predicted availability of crowdworkers of the second level of expertise and the trained first number of crowdworkers satisfies a demand based on the predicted flow of the second set of tasks over a predetermined period of time;
determine an expertise gap between a current level of expertise possessed by a first crowdworker and the second level of expertise, wherein the current level of expertise meets or exceeds the first level of expertise and wherein determining the expertise gap comprises:
converting the current level of expertise of the first crowdworker, the second level of expertise, and the first level of expertise to discrete values based on an expertise mapping table, and
calculating a ratio of a Euclidean distance between the discrete value of the current level of expertise and the discrete value of the discrete value of the second level of expertise and a Euclidean distance between a discrete value of a lowest theoretical expertise and a discrete value of a highest theoretical expertise, wherein the ratio represents the expertise gap;
calculate a learning rate for the first crowdworker, wherein the learning rate is calculated based on a universal rate of learning that is modified by the expertise gap;
identify training tasks for the first crowdworker to achieve the second level of expertise based on the determined expertise gap;
determine a predicted set of tasks that comprise non-training tasks predicted to be received prior to the predetermined period of time;
access service requirements for the first set of tasks; and
train the crowdworkers such that upon completion of the training of the crowdworkers, the predicted availability of crowdworkers of the second level of expertise will satisfy the demand based on the predicted flow of the second set of tasks, wherein training the crowdworkers comprises:
assigning, based on the learning rate, a set of training tasks to the first crowdworker such that the first crowdworker comprises availability for the non-training tasks of the predicted set of tasks and such that processing requirements for the predicted set of tasks are met by the first crowdworker and other crowdworkers that are available to process the predicted set of tasks and that comprise a skill level required to process the predicted set of tasks.

10. The server of claim 9, wherein the processor and memory are further configured to: determine a first time interval corresponding to the first crowdworker for completing the identified training tasks based on the expertise gap.

11. The server of claim 10, wherein the processor and memory are further configured to: validate a response to at least one of the identified training tasks from the first crowdworker.

12. The server of claim 11, wherein the learning rate of the first crowdworker is based on the first time interval, the validation, and the expertise gap, and wherein the learning rate is indicative of a level of expertise gained by the first crowdworker by completing the at least one identified training tasks.

13. The server of claim 12, wherein the processor and memory are further configured to: determine a number of training tasks for the first crowdworker to achieve the second level of expertise based on the first time interval the expertise gap.

14. A computer program product for achieving efficient task processing using automation techniques based on predicted conditions, the computer program product comprising a non-transitory computer readable medium embodied therein comprising a set of instructions executable by a processor for training a crowdworker, the processor executing the set of instructions to:
predict a flow of received tasks and an availability of crowdworkers of a first level of expertise and second level of expertise over a predetermined period of time, the predicting being based on historical data, wherein the flow of received tasks includes a first set of tasks corresponding to the first level of expertise and a second set of tasks corresponding to a second level of expertise;

determine based on the predicted flow of received tasks and the predicted availability of crowd workers, to train a first number crowdworkers such that the predicted availability of crowdworkers of the second level of expertise and the trained first number of crowdworkers satisfies a demand based on the predicted flow of the second set of tasks over a predetermined period of time;

determine an expertise gap between a current level of expertise possessed by a first crowdworker and the second level of expertise, wherein the current level of expertise meets or exceeds the first level of expertise and wherein determining the expertise gap comprises:
  converting the current level of expertise of the first crowdworker, the second level of expertise, and the first level of expertise to discrete values based on an expertise mapping table, and
  calculating a ratio of a Euclidean distance between the discrete value of the current level of expertise and the discrete value of the discrete value of the second level of expertise and a Euclidean distance between a discrete value of a lowest theoretical expertise and a discrete value of a highest theoretical expertise, wherein the ratio represents the expertise gap;

calculate a learning rate for the first crowdworker, wherein the learning rate is calculated based on a universal rate of learning that is modified by the expertise gap;

identify training tasks for the first crowdworker to achieve the second level of expertise based on the determined expertise gap;

determining a predicted set of tasks that comprise non-training tasks predicted to be received prior to the predetermined period of time;

accessing service requirements for the first set of tasks; and train the crowdworkers such that upon completion of the training of the crowdworkers, the predicted availability of crowdworkers of the second level of expertise will satisfy the demand based on the predicted flow of the second set of tasks, wherein training the crowdworkers comprises:
  assigning, based on the learning rate, a set of training tasks to the first crowdworker such that the first crowdworker comprises availability for the non-training tasks of the predicted set of tasks and such that processing requirements for the predicted set of tasks are met by the first crowdworker and other crowdworkers that are available to process the predicted set of tasks and that comprise a skill level required to process the predicted set of tasks.

15. The product of claim 14, wherein the processor further executes the set of instructions to determine a first time interval corresponding to the first crowdworker for completing the identified training tasks based on the expertise gap.

16. The product of claim 15, wherein the processor further executes the set of instructions to validate a response to at least one of the identified training tasks from the first crowdworker.

17. The product of claim 16, wherein the learning rate of the first crowdworker is based on the first time interval, the validation, and the expertise gap, and wherein the learning rate is indicative of a level of expertise gained by the first crowdworker by completing the at least one identified training tasks.

* * * * *